Figure 1:
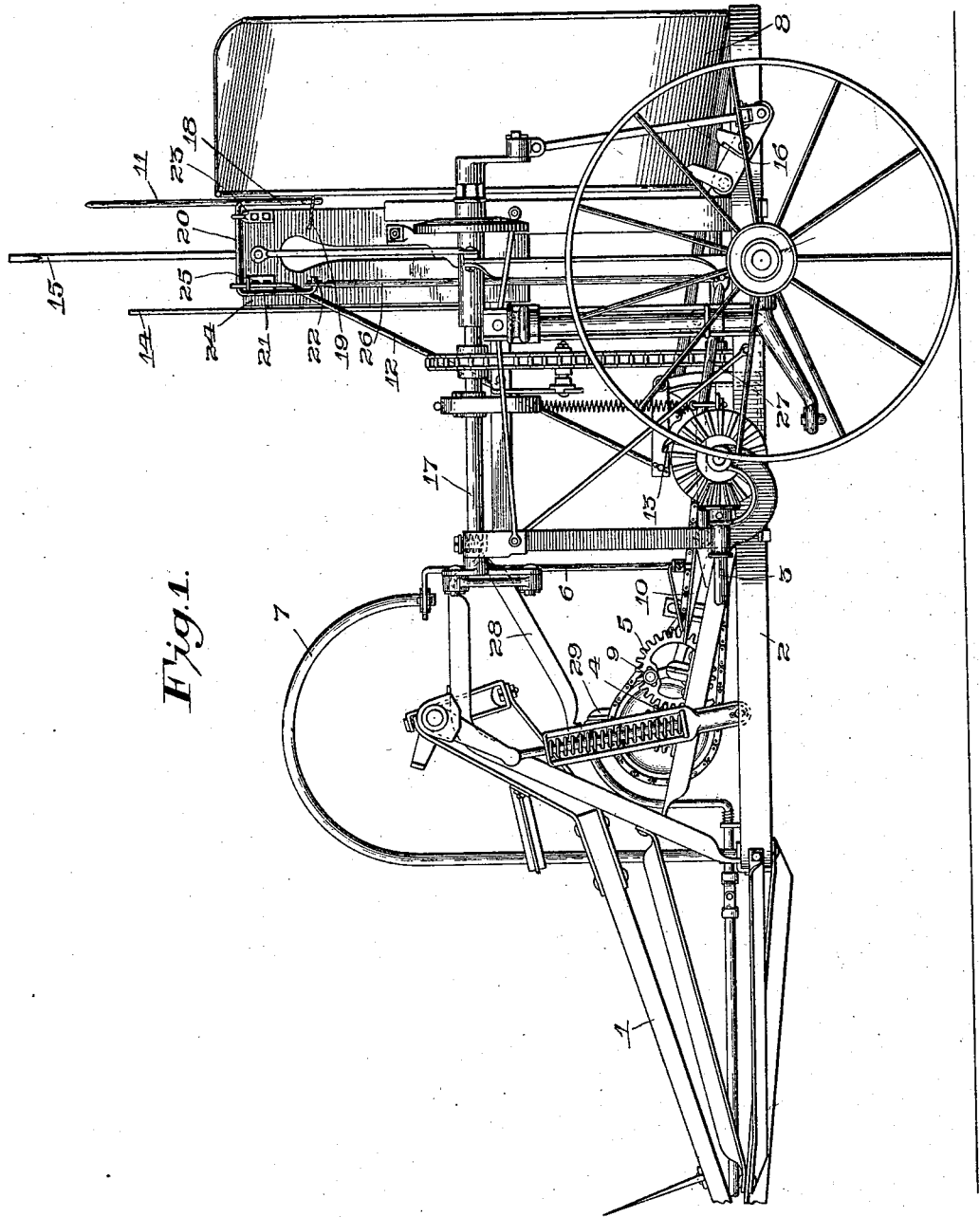

C. R. RANEY & B. R. BENJAMIN.
SHOCKING MACHINE.
APPLICATION FILED JAN. 18, 1913.

1,188,486.

Patented June 27, 1916.
2 SHEETS—SHEET 1.

Witnesses:

Inventors:
Clemma R. Raney
and
Bert R. Benjamin,
By Chas. E. Lord
Atty.

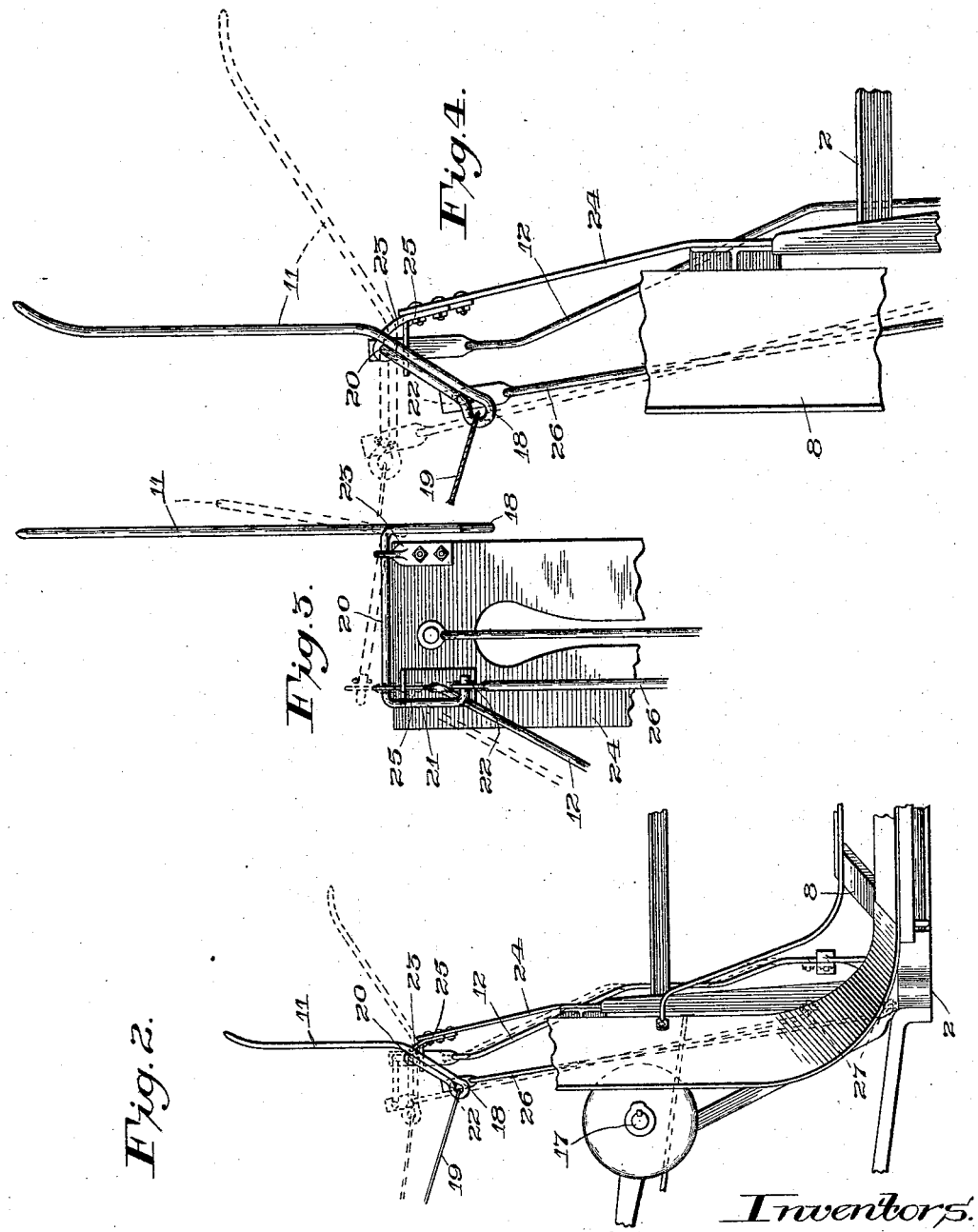

UNITED STATES PATENT OFFICE.

CLEMMA R. RANEY, OF CHICAGO, AND BERT R. BENJAMIN, OF OAK PARK, ILLINOIS, ASSIGNORS TO INTERNATIONAL HARVESTER COMPANY OF NEW JERSEY, A CORPORATION OF NEW JERSEY.

SHOCKING-MACHINE.

1,188,486.

Specification of Letters Patent.

Patented June 27, 1916.

Application filed January 18, 1913. Serial No. 742,774.

*To all whom it may concern:*

Be it known that we, CLEMMA R. RANEY and BERT R. BENJAMIN, citizens of the United States, residing at Chicago and Oak Park, respectively, in the county of Cook and State of Illinois, have invented certain new and useful Improvements in Shocking-Machines, of which the following is a full, clear, and exact specification.

Our invention relates to shocking machines.

It has among its objects to provide improved controlling mechanism for a shocker whereby an operator on the machine may aline the shocks in the field in such a manner as to facilitate the collection of the same or discharge any number of sheaves in the shock receptacle when it is desired to do so for any reason.

A further object of our invention is to provide improved means whereby an operator on the machine may cause the sheaves to be discharged from the shock receptacle when desired irrespective of the number of sheaves therein, yet without conflict with the sheaf delivery mechanism.

We attain these objects by providing improved means coöperating with the mechanism of an automatic shocker which render the same operable to discharge the sheaves in the cradle at any times desired by the operator on the harvester other than when a sheaf is being delivered to the receptacle.

In order to illustrate our invention fully and clearly, we have shown in the accompanying drawings one form which it may assume in practice. It is to be understood, however, that this embodiment of our invention is susceptible of modification.

Figure 1 is a side elevation of a shocker; Fig. 2 is a detail view of the hand controlled mechanism; Fig. 3 is a side elevation of a portion of the mechanism shown in Fig. 2; Fig. 4 is an end elevation of this mechanism when the pull cord is operated.

The shocker shown is of the well known Raney type wherein a pivoted sheaf delivering member 1 is pivotally mounted upon the frame 2 of the shocker and operable through power connections 3 and deflecting means, including pinions 4 and 5, a crank 6 and a pivoted guide 7 movable thereby, to oscillate about its pivot and deposit the sheaves alternately on opposite sides of a pivoted upwardly and rearwardly dumping sheaf receiving cradle or shock receptacle 8.

In this construction a roller 9 on the pinion 5 engages a pivoted arm 10 during each revolution of the pinion and actuates this arm to rock a feeler arm 11 about its pivot at one side of the frame and above the cradle in such a manner as to dip into the cradle, this action taking place when the sheaf delivery member 1 is delivering a sheaf to the opposite side of the cradle. When the cradle is filled to a predetermined degree, this feeler arm then engages with a sheaf and moves about the same as a pivot in such a manner as to raise a link 12 connected thereto, which in turn releases a clutch 13 controlling the action of the shock compressing arm 14, the binding needle 15 and the dumping mechanism 16, through its connection to the binder shaft 17 and the power connection 3.

In this embodiment of our improvement we have provided improved means adapted to coöperate with a shocker of the Raney type, which means enable the shock binding and dumping mechanism to be maintained under the control of the operator so that when alining the shocks in the field or when the machine is at the end of the field, or, in fact, if it is desired for any other reason to bind or dump the sheaves in the cradle before the latter is filled sufficiently to cause the size control mechanism to act, the operator may do so.

Further, it will be noted that in our improved construction, although the operator may discharge the sheaves at any desired time, he is effectually prevented from operating the discharging mechanism while a sheaf is being delivered to the receptacle, any conflict between the sheaf delivery member and receptacle being thus avoided.

In our improvement the feeler arm 11 is of a modified construction from that used in the Raney shocker, being pivoted intermediate its ends at the top of the frame and provided with a laterally extending arm 18 at the stubbleward end of its pivot adapted to receive the end of a cord or link 19 operable from the operator's seat on the binder (not shown) and projecting above the binder shaft 17 on the shocker. An arm 20 preferably integral with the arm 11, is also protruded substantially at right angles to the latter at a point intermediate its ends, and this arm 20 is provided at its end with another extension 21 disposed substantially at right angles thereto. A laterally extending lug 22 is likewise provided at the end of the member 21.

As shown in Figs. 1 and 3, the laterally disposed portion 20 of the arm 11 is journaled at a point adjacent the arm 11 in a single bearing 23 carried upon the top of the shocker breast plate 24 in such a manner that it may rock about this bearing as a pivot. The free end of the portion 20 is also operatively connected, preferably pivotally, to the upper end of the clutch controlling link 12, which is mounted for vertical movement in a guide member 25 fixed to the member 24. As shown, the lug 22 on this member 20 is also pivotally connected through a link 26 and a pivoted crank member 27 to the tripping member 10.

Coöperating with this mechanism, and controlled thereby, is the mechanism rendering the sheaf delivering member 1 inoperative. This mechanism is also of the Raney construction and includes a pivoted spring-pressed member 28 carried by the frame and operated by the connections to the needle 15 when the latter is actuated to swing into engagement with the clutch controlling finger 29 of the sheaf delivering clutch in the manner in which it does in that construction. Obviously, this mechanism is automatically operated whenever the binding mechanism is operated and releases the finger 29 and automatically returns to its initial position upon the return of the binding needle from each binding operation.

The operation of the construction shown is as follows: When the sheaf delivery member 1 is thrown about its pivot by its operating mechanism, the pinion 5 is rotated, causing the roller 9 to engage with the trip 10 during each revolution of the same. The movement imparted to the trip 10 turns the crank member 27 and acts to elevate the link 26, throwing the feeler arm 11 downward about its pivot to perform its feeling function. The normal operation of the feeler arm 11 is therefore substantially the same as that of the feeler arm of the Raney construction. When, however, the cord connected to the end of the extension 18 is pulled and held taut, the feeler arm 11 assumes the position shown in dotted lines in Fig. 4, the rod 26 being partly raised, but not raised so far as it is when the roller 9 depresses the trip 10. When the cord is held taut, therefore, and the roller 9 depresses this trip 10, the cord prevents the further rocking of the arm 20, the same as if the feeler arm 11 was in contact with sheaves in the shock receptacle, with the result that the forward end of the arm 20 is raised and the rod 12 is raised in such a manner as to release the clutch 13. In other words, when the cord is pulled the arm 11, regardless of the position of the roller 9, is thrown into the position shown in dotted lines in the drawings (Fig. 4), and held in this position by the operator until the roller 9 engages with the trip member 10 to depress the same and raise the link 26 to disengage the clutch 13 controlling the sheaf compressing, binding and discharging mechanism. (See Figs. 2 and 3.) Obviously, when the binding mechanism is operated the sheaf delivering mechanism is automatically rendered inoperative.

It is to be noted that in this construction automatic mechanism is provided which operates to compress, bind and discharge the shock from the cradle when the shocks in the latter have reached a predetermined height, and that the supplemental manually controlled mechanism does not in any way interfere with the operation of the automatic, but is supplemental thereto and coöperates therewith under predetermined conditions, placing the parts in a position to be operated by the automatic mechanism upon the delivery of the next sheaf rather than after a considerable period such as would normally be required to fill the cradle. In this way the operator is at liberty to discharge any number of sheaves from the cradle at any desired time. It is further to be noted that the operator is also placed in control of the sheaf delivery mechanism and is enabled to stop the movement of the sheaf delivering member thereof at any desired time should this be necessary for any reason.

While we have described one embodiment of our invention in this application, it is to be understood that the form shown herein is susceptible of modification.

What we claim as our invention, and desire to secure by Letters Patent, is:

1. In a shocking machine, sheaf delivery mechanism, mechanism for discharging at intervals the sheaves delivered thereby, and manually operable means controlled by said delivery mechanism for expediting the operation of said discharging mechanism.

2. In a shocking machine, sheaf delivery mechanism, mechanism for discharging at intervals the sheaves delivered thereby, and means controlled by an operator and set in operation by said delivery mechanism for expediting the operation of said discharging mechanism.

3. In a shocking machine, sheaf delivery mechanism, mechanism for binding and discharging at intervals the sheaves delivered thereby, and means controlled by an operator and set in operation by said delivery mechanism for expediting the operation of said binding and discharging mechanism.

4. In a shocking machine, sheaf delivery mechanism, a sheaf receiving member receiving sheaves therefrom, and mechanism normally discharging the sheaves in said receiving member when they have reached a predetermined bulk under the control of an operator and operable only in a predetermined position of said delivery mechanism.

5. In a shocking machine, sheaf delivery mechanism, a sheaf receiving member receiving sheaves therefrom, automatic mechanism for binding and discharging at intervals the sheaves in said receiving member, and means under the control of an operator and set in operation by said delivery mechanism at a predetermined point in its sheaf delivery movement controlling said binding and discharging mechanism.

6. In a shocking machine, sheaf delivery mechanism, including a movable sheaf delivery member, mechanism for discharging the sheaves delivered thereby, and means under the control of an operator and set in operation by one of said above mentioned mechanisms as delivery member returns from the delivery of a sheaf controlling the discharge of said sheaves and said delivery mechanism.

7. In a shocking machine, sheaf delivery mechanism, automatic mechanism for discharging at intervals the sheaves delivered thereby, and means under the control of an operator and operable only at a predetermined time in the operation of said delivery mechanism for expediting the action of said automatic mechanism.

8. In a shocking machine, sheaf delivery mechanism, a sheaf receiving cradle receiving sheaves therefrom, automatic mechanism for discharging at intervals the sheaves in said cradle, and means under the control of an operator and operable only at a predetermined time in the operation of said delivery mechanism controlling the operation of said discharging mechanism and said delivery mechanism.

9. In a shocking machine, sheaf delivery mechanism, a sheaf receiving member receiving sheaves therefrom, mechanism for discharging the sheaves in said receiving member, automatic mechanism controlling the discharge of said sheaves, and supplemental controlling means therefor under the control of an operator and set in operation by said controlling mechanism.

10. In a shocking machine, sheaf delivery mechanism, a sheaf receiving member receiving sheaves therefrom, mechanism for discharging the sheaves in said receiving member, automatic mechanism intermittently actuated by said delivery mechanism controlling said discharging mechanism, and supplemental controlling means for the latter under the control of an operator and set in operation by one of said first mentioned mechanisms.

11. In a shocking machine, a movable sheaf receiving cradle, sheaf delivery mechanism building a prostrate shock therein, mechanism actuated by said delivery mechanism for operating said cradle at intervals, and means under the control of an operator coöperating with said last mentioned mechanism and set in operation thereby whereby said cradle may be rendered operable at any desired time.

12. In a shocking machine, a movable sheaf receiving cradle, sheaf delivery mechanism building a prostrate shock therein, automatic mechanism for operating said cradle at intervals, and means coöperating with said last mentioned mechanism and set in operation thereby for rendering said cradle operating mechanism operable and said sheaf delivery mechanism inoperative at any desired time.

13. In a shocking machine, a movable sheaf receiving cradle, sheaf delivery mechanism building a prostrate shock therein, automatic mechanism for operating said cradle controlled by the bulk of the sheaves therein, and supplemental manually controlled means set in operation by said size control mechanism for rendering said cradle operating mechanism operable at any desired time.

14. In a shocking machine, sheaf delivery mechanism, a sheaf receiving member receiving sheaves therefrom, automatic mechanism operatively connected to said delivery mechanism for binding and discharging the sheaves in said receiving member at intervals, and means under the control of an operator and set in operation by said automatic mechanism for expediting the operation thereof and rendering said delivery mechanism inoperative.

15. In a shocking machine, a rearwardly tilting sheaf receiving cradle, sheaf delivery mechanism building a prostrate shock therein, automatic mechanism for discharging the sheaves in said cradle, and means under the control of an operator and set in operation by said delivery mechanism for controlling the operation of said discharging mechanism and rendering said delivery mechanism inoperative.

16. In a shocking machine, a frame, a rearwardly tilting sheaf receiving cradle thereon, sheaf delivery mechanism including a swinging shock building member building a prostrate shock therein, mechanism for discharging the sheaves therein, controlling mechanism for said discharging mechanism operable when the sheaves in said cradle have reached a predetermined height, and means controlled by an operator and actuated by said controlling mechanism for rendering said discharging mechanism operable and said shock building member inoperative at any desired time.

17. In a shocking machine, a rearwardly tilting sheaf receiving cradle, sheaf delivery mechanism including a movable sheaf delivery member building a prostrate shock therein, automatic mechanism for discharging the sheaves in said cradle, and means under the control of an operator and operable by one of said mechanisms only at a predetermined time in the operation of said delivery mechanism for controlling the operation of said discharging mechanism.

18. In a shocking machine, a movable sheaf receiving cradle, sheaf delivery mechanism including a swinging shock building member building a prostrate shock therein, automatic mechanism for operating said cradle and rendering said shock building member inoperative controlled by the bulk of the sheaves in said cradle, and intermittently actuated by said delivery mechanism and supplemental manually controlled means rendering said last mentioned mechanism operable at any desired time.

19. In a shocking machine, a movable sheaf receiving cradle, sheaf delivery mechanism including a swinging shock building member building a prostrate shock therein, automatic mechanism for operating said cradle, mechanism controlled by the height of the sheaves therein controlling the operation of said mechanism, and supplemental means under the control of the operator and actuated by one of said mechanisms rendering said controlling mechanism operable at any desired time.

20. In a shocking machine, a movable sheaf receiving cradle, sheaf delivery mechanism including a swinging shock building member building a prostrate shock therein, automatic mechanism for operating said cradle, mechanism controlled by the size of the shock therein and actuated by said delivery mechanism controlling the operation of said automatic mechanism, and supplemental means under the control of the operator and operatively connected to said last mentioned mechanism for rendering said controlling mechanism operable at any desired time.

21. In a shocking machine, a movable sheaf receiving cradle, sheaf delivery mechanism including a swinging sheaf delivery member coöperating therewith, mechanism for deflecting said member laterally, mechanism for discharging the sheaves from said cradle at intervals, and supplemental means coöperating with said deflecting mechanism for rendering said discharging mechanism operable at any desired time.

22. In a shocking machine, a movable sheaf receiving cradle, sheaf delivery mechanism including a sheaf delivering member movable in an upright plane coöperating therewith, mechanism for deflecting said member laterally while delivering a sheaf to said cradle, and manually controlled means coöperating with said deflecting mechanism and controlling the discharge of the sheaves from said cradle.

23. In a shocking machine, a movable sheaf receiving cradle, sheaf delivery mechanism including a sheaf delivering member movable in an upright plane coöperating therewith, means for deflecting said member laterally during its movement to said cradle, and means set in operation by said deflecting mechanism and under the control of the operator for discharging the sheaves from said cradle.

24. In a shocking machine, a frame, a movable sheaf receiving cradle carried thereon, mechanism for delivering sheaves thereto, a movable feeler arm operated by said mechanism to dip into said cradle, shock discharging mechanism automatically set in operation by said feeler arm when the sheaves in said cradle have reached a predetermined height, and means rendering said discharging mechanism operable at any desired time.

25. In a shocking machine, a frame, a movable sheaf receiving cradle carried thereon, mechanism for delivering sheaves thereto, a movable feeler arm operated by said mechanism to dip into said cradle, shock discharging mechanism automatically set in operation by said feeler arm when the sheaves in said cradle have reached a predetermined height, and manually operated means rendering said discharging mechanism operable at any desired time.

26. In a shocking machine, sheaf delivery mechanism including a swinging sheaf delivery member movable back and forth in an upright plane, a tilting sheaf receiving member receiving sheaves therefrom, automatic mechanism operable to bind and discharge the sheaves in said receiving member at intervals, and means under the control of an operator and operable at all times except when said delivery member is delivering a sheaf to said receiving member for controlling the time of operation of said automatic mechanism and simultaneously and automatically rendering said sheaf delivery mechanism inoperative during the binding and discharging operation.

27. In a shocking machine, a rearwardly dumping shock receptacle, a swinging shock building member movable in an upright plane and building a prostrate shock therein, mechanism for operating said receptacle and shock building member, controlling mechanism therefor automatically operable at predetermined times to dump said receptacle and throw said shock building member out of operation, and supplemental controlling means for operating said controlling mechanism at any desired time.

28. In a shocking machine, a rearwardly dumping shock receptacle, a swinging shock building member movable in an upright plane and building a prostrate shock in said receptacle, mechanism for operating said receptacle and shock building member, controlling mechanism therefor automatically operable when the shock built by said member has reached a predetermined size to dump said receptacle and throw said shock building member out of operation, and manually controlled means for controlling said controlling mechanism.

In testimony whereof we affix our signatures, in the presence of two witnesses.

CLEMMA R. RANEY.
BERT R. BENJAMIN.

Witnesses:
RAY PATTISON,
WILLIAM WEBBER.

Copies of this patent may be obtained for five cents each, by addressing the "Commissioner of Patents, Washington, D. C."